April 29, 1924.

J. F. MILLER

RESILIENT WHEEL

Filed March 19, 1923    2 Sheets-Sheet 1

1,492,081

Inventor

J. F. Miller

By Lacey & Lacey, Attorneys

April 29, 1924.
J. F. MILLER
1,492,081
RESILIENT WHEEL
Filed March 19, 1923  2 Sheets-Sheet 2
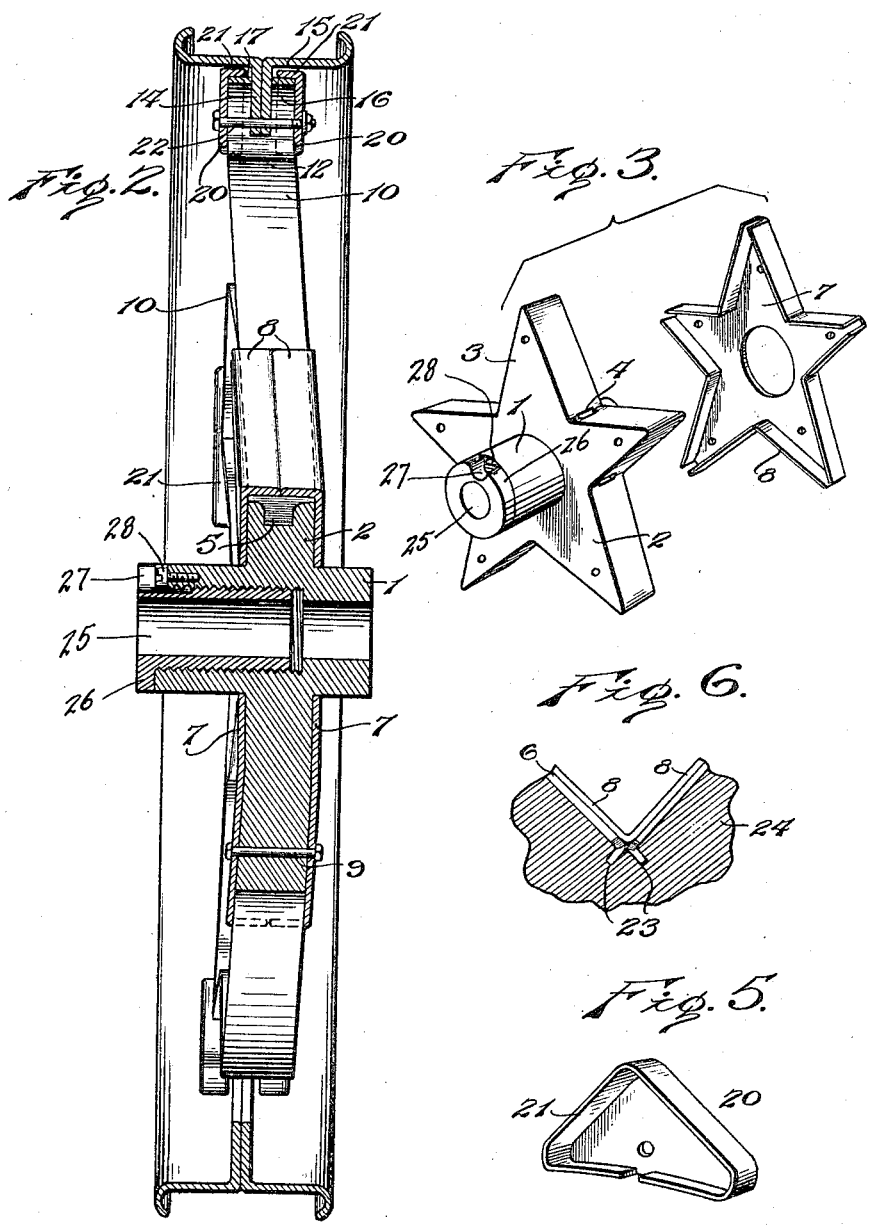
Inventor
J. F. Miller
By Lacey & Lacey, Attorneys Patented Apr. 29, 1924.

1,492,081

UNITED STATES PATENT OFFICE.

JAMES F. MILLER, OF MINDEN, LOUISIANA.

RESILIENT WHEEL.

Application filed March 19, 1923. Serial No. 626,099.

*To all whom it may concern:*

Be it known that I, JAMES F. MILLER, a citizen of the United States, residing at Minden, in the parish of Webster and State of Louisiana, have invented certain new and useful Improvements in Resilient Wheels, of which the following is a specification.

This invention relates to spring wheels and has for its object to produce a novel form of wheel of such construction that the resilient spokes will be effectually reinforced and enabled to support a heavily loaded vehicle. Another object of the invention is to provide a novel construction whereby displacement of the spokes will be prevented, and a still further object of the invention is to provide a construction which will facilitate the assembling of the spokes with the rim and the hub. Other incidental objects of the invention will appear in the course of the following description.

The objects of my invention are attained in such a wheel as is illustrated in the accompanying drawings and in said drawings, Figure 1 is a side elevation, partly broken away, of a wheel embodying my improvements;

Fig. 2 is an enlarged transverse section on the line 2—2 of Fig. 1;

Fig. 3 is a view showing members of the hub in perspective;

Fig. 5 is a detail perspective view of a cap employed in connection with the outer end of the spoke, and Fig. 6 is a detail sectional view showing one construction for retaining the end of the spoke in the hub.

Figure 1:
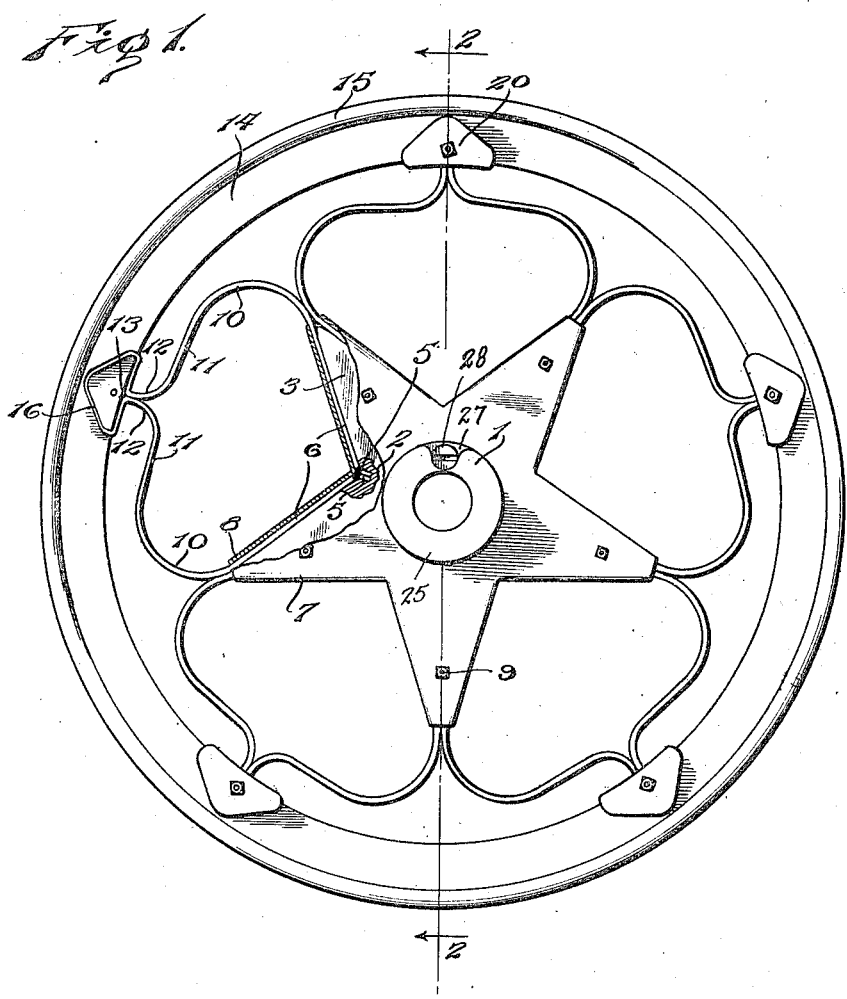
Figure 4:
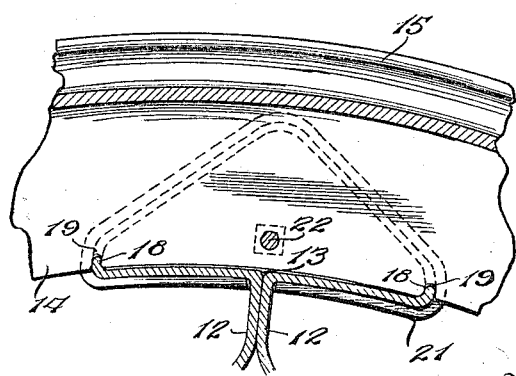
Fig. 4 is a longitudinal section through a portion of the rim, particularly showing the manner of attaching the outer ends of the spokes to the rim.

The hub includes a sleeve 1 which, as shown most clearly in Fig. 2, is preferably constructed in two members threaded together whereby it may be adapted to a spindle or axle of any standard length. Carried by the sleeve 1 between the ends thereof is a body 2 which is preferably cast integral with one member of the sleeve, and this body is formed with radial projections 3 adapted to fit between the inner ends of adjacent spokes, as shown clearly in Fig. 1. While the number of these projections is, of course, determined principally by the load the wheel is designed to carry and by the size of the wheel, they are substantially triangular in outline and the complete body has the appearance of a star, a five-pointed star appearing in the present instance. In the angles formed by the inwardly converging adjacent edge surfaces of adjacent points of the star, I form sockets 4 in which the terminals of the spokes are engaged, and preferably, the spokes terminate in central teeth or spurs 5 so that, when they are engaged in the said sockets or recesses 4, the spokes will be disposed centrally of the hub body and will not project beyond either side of the same. The end portions 6 of each spoke converge toward the hub sleeve, as shown in Fig. 1, so that they lie flat against the surfaces of the points 3 and to retain the end portions of the spokes in position upon the hub and prevent lateral displacement thereof, I provide the caps or cover plates 7 which have the same outline as the hub body and are constructed along their edges with the inwardly projecting flanges 8 adapted to lie upon the outer surfaces of the end portions 6 of the spoke, as will be readily understood. The flanges will preferably abut, as shown in Fig. 2, and they are secured rigidly to the hub body by bolts 9 inserted through openings provided therefor in the caps and in the hub body, as will be readily understood.

The spokes are constructed of resilient metal straps or bars and present the bowed portions 10 from which the end portions 6 extend inwardly, the sides of each spoke extending inwardly, as shown at 11, from the bowed portions 10 and being turned outwardly, as shown at 12, on the central radial line of the spoke so that a heart-shaped figure is defined by each spoke. The outwardly turned portions 12 abut, as shown at 13, immediately adjacent the inner edge of the central rib 14 on the rim 15 and are then carried in opposite directions and converge upwardly to form a substantially triangular head or loop 16. This loop or head is longitudinally slotted or notched, as indicated at 17, whereby its side portions may fit against the rib 14 at opposite sides of the same, and lips 18 will be produced at the base of the triangular head to engage notches 19 in the rim and thereby prevent displacement of the outer ends of the spokes. To further secure the spokes in place, I provide the caps 20 which consist of substantially triangular plates of proper size to fit closely against the triangular heads 16 and provide along their edges with inwardly projecting flanges 21 to engage around the side portions of the head, as clearly shown in Fig. 2. A clamping bolt 22 is inserted transversely through the rib 14 and through openings provided therefor in the side plates of the caps 20 so as to secure the caps firmly to the rim, as will be readily understood.

In Fig. 1, the inner terminals of the spokes are disposed in abutting relation and radially of the hub, and this construction is simple and permits ready assembling of the spokes and the hub. The terminals of the spokes, however, may be arranged in diverging relation, as shown at 23 in Fig. 6, the hub body 24 being provided with correspondingly arranged sockets, as will be readily understood. This arrangement will probably possess somewhat greater strength than the arrangement shown in Fig. 1 and previously described, inasmuch as the terminals of the spokes are disposed at an angle to the normal line of pull but either arrangement may be used at will.

As previously stated, the central sleeve portion of the hub consists of two members having threaded engagement. This construction is shown clearly in Fig. 2, and obviously the bores of the two sleeve sections are of the same diameter so as to properly receive the axle spindle. By rotating the inner section 25 of the sleeve, said section will be caused to ride into or out of the outer section and it may be thus set to give the hub sleeve any desired working length so as to conform to the length of the axle spindle. The outer end of the section 25 is constructed with an annular stop flange 26, as clearly shown, which will limit the inward movement of the said section by abutting against the end of the outer section so that the hub sleeve will have a fixed minimum extent. Through this flange 26, a notch or opening 27 is formed and, to secure the said section in a fixed relation to the relatively stationary section, a screw 28 is engaged through the opening into the body of the relatively fixed section so that, if the said screw be turned home with its outer end resting within the said opening, the further rotation of the adjustable section will be prevented.

It is thought from the foregoing description, taken in connection with the accompanying drawings, that it will be readily seen that I have provided a very simple and strong wheel which will have easy riding qualities but will not be subjected to the disadvantages and inconvenience arising from the use of pneumatic tires which are liable to be punctured or destroyed by blowouts. Pneumatic tires, however, may be used upon my wheel and as result of the use of such tires combined with the resilient qualities of the wheel itself, a very easy riding vehicle may be produced. The tire is, of course, secured upon the rim between the side flanges thereof in the usual or any preferred manner.

Having thus described the invention, what is claimed as new is:

1. In a resilient wheel, the combination of a rim, a hub body having radially extending portions, resilient spokes having outer head members secured to the rim and inner end portions bearing against the opposed edges of adjacent radially projecting portions of the hub, and caps secured to the sides of the hub body and having inwardly projecting marginal flanges extending over and bearing upon the end portions of the spokes.

2. In a resilient wheel, the combination of a rim, a hub body having radially extending portions and provided at the bases of said portions with sockets, resilient spokes secured at their outer ends to the rim and having their inner end portions bearing against the opposed edges of adjacent radially extending portions of the hub body and constructed with terminals fitting in the sockets at the base of the body, and caps secured to the sides of the hub body and provided with marginal flanges extending over the end portions of the spokes.

3. In a resilient wheel, the combination of a rim, a hub having radially extending tapered portions, resilient spokes having outer central portions and portions extending in opposite directions from said central portions circumferentially of the rim, bowed portions connected with said circumferentially extending portions and inwardly converging inner end portions lying against the opposed surfaces of adjacent radially extending portions of the hub, means for securing said inner end portions of the spokes to the hub, and means for securing the outer portions of the spokes to the rim.

In testimony whereof I affix my signature.

JAMES F. MILLER. [L. S.]